INVENTORS
GIDEON MAIDANIK
DONALD W. JORGENSEN

BY

ATTORNEYS

United States Patent Office

3,540,287
Patented Nov. 17, 1970

3,540,287
BOUNDARY WAVE VECTOR FILTER
Gideon Maidanik, Chevy Chase, Md., and Donald W. Jorgensen, Washington, D.C., assignors to the United States of America as represented by the Secretary of the Navy
Filed Sept. 27, 1968, Ser. No. 764,045
Int. Cl. G01l 9/08
U.S. Cl. 73—398    9 Claims

ABSTRACT OF THE DISCLOSURE

An array of transducers flush mounted in a boundary for measuring the pressure field on the boundary. This pressure field may arise, for example, due to turbulence in the boundary layer. The transducers of the array are of specific sizes, arranged in a specific geometrical form and are electrically connected for individual shading and phasing. The array acts as a spatial filter having a well defined spectral acceptance region producing outputs indicative of the wave vector spectral nature of the pressure field on the boundary. The incorporation of a frequency filter provides also for temporal filtering.

---

The invention described herein may be manufactured and used by or for the Government of the United States of America for governmental purposes without the payment of any royalties thereon or therefor.

BACKGROUND

The study of boundary pressure fields is important to scientists who design vehicles that are destined to move through fluid media. The boundary pressure fields interfere with the proper operation of flush-mounted signal detecting transducers in a sonar system; it excites the panel-like structures of the vehicle causing undesirable acoustic fields both internally and externally, etc. In order to devise accurate means for suppressing the spurious effects caused by these pressure fields, one must decipher their nature. Indeed, a considerable effort has been devoted to studying the nature of boundary pressure fields, particularly those caused by a turbulent boundary layer. Hitherto, the theoretical approach has not been able to yield with certainty the major properties of the pressure field due to a turbulent boundary layer. The non-linear nature of this pressure field renders the theoretical tools most difficult to manipulate.

Most of the analyses of previously obtained data have been limited to the frequency domain, and only rough inferences of the wave vector spectral nature of the pressure field have been made. A simple analysis of the wave vector nature of a single transducer and the two transducer systems would show that these systems are very crude wave vector filters. Since a complete knowledge of a pressure field is on hand only when its complete spectral nature is known, the lack of proper wave vector filters has hampered the quest for better data concerning the pressure field in a turbulent boundary layer and other sources of boundary pressure fields.

Although there is considerable literature available on the transducer array systems, those concerned with the measurements of non-acoustic pressure field on a boundary have not yet been able to design and employ more suitable wave vector filters to enhance the effectiveness of their research.

SUMMARY

According to the present invention there is provided a three dimensional filtering system for determining the spectral characteristics of a pressure field on a boundary. By way of example and not limitation, the pressure field may be that of a propagated acoustic signal; of a stationary or moving pressure field of unknown origin, or of a stationary or moving turbulent boundary layer, or combinations of these fields.

The filter of the present invention is three dimensional in that it comprises a two dimensional array of pressure transducers the geometry of which provides a region of wave numbers ($k_1$, $k_3$) representing the wave-vector acceptance characteristic of the filter. The third dimension is that of frequency ($\omega$). The acceptance characteristic of the array by proper choice of the sizes of the transducers and the geometrical placement of the transducers is that of a substantially single band filter having a single peak response of width $\pi/Nd_1$ where N is the number of transducer elements in one dimension and $d_1$ is the spacing between adjacent transducers in this direction. For example (see FIG. 1) in the particular situation of rectangular transducers each of width $b_1$ in the direction $x_1$ where the separation $d_1$ between adjacent transducers in this direction is such that $d_1/b_1=3/2$, a single wavenumber band filtering in $K_1$ is achieved. The response of the single band wave vector filter of the invention, shown in FIG. 1, has its maximum at the wave number $$K_1 = \frac{\pi}{d_1}$$

Similarly, a single wavenumber band filtering in $K_3$ can be achieved by arranging for the width $b_3$ of the transducer in the direction $x_3$ to be $d_3/b_3=3/2$ where $d_3$ is the separation between adjacent transducers in the $x_3$ direction. In this example the electrical polarity of adjacent transducers is opposite.

The wave numbers ($k_1$, $k_3$) representing the peaks in the response of the filter array can be varied by phasing (time displacement) the onput of the transducers. The frequency band of the filter can be varied in a known manner, as by variable bandpass filter connected in circuit with the output of the array, so that a well defined spectral acceptance region is provided.

Explanatory graph FIG. 3 indicates the filtering advantages of the present filter in a pressure field shown here for illustrative purposes only as that of a turbulent boundary layer having a convection velocity $U_c$. In the normalized coordinates of the FIG. 3 graph $\omega$ (frequency) is plotted as the ordinate versus wave vectors ($k_1$) as the abscissa. The $k_1$ axis is the Fourier conjugate of spatial position vector $x_1$, and the $\omega$ axis is the Fourier conjugate variable of temporal variable $t$. A propagated acoustic signal pressure field is represented by curve A. The pressure field of a turbulent boundary layer of convection velocity $U_c$ is represented by the dots having a slope generally concurrent with the line of greatest density of the dots. The purpose of the filter is to provide in normalized space a well-defined filtered (acceptance) region $R_1$ which region can be moved by phasing and manipulation of the frequency filter within a large region S without change in the array geometry, so that the spectral characteristics (e.g. frequency and wave vector distribution characteristics) of any boundary pressure field in this region may be discerned.

Several transducer arrays of different geometries (e.g. size and spacing) may be employed simultaneously to provide a plurality of well defined regions R throughout a measurement exercise. Also, multiband acceptance characteristics (see FIG. 2) may also be provided in a filter according to the invention although the output of such a filter may be more ambiguous than that of the single band because of a plurality of acceptance peaks (i.e. plurality of wave numbers).

Accordingly, the objects of the present invention are to provide:

A transducer arrangement for producing wave vector filtering in order to determine the characteristics of the pressure field on a boundary.

A transducer arrangement for determining the nature of the pressure field of a turbulent boundary layer, and having improved capabilities of adjustment in both sensitivity and phasing for affording more complete measurement data.

The above objects as well as other objects, features and advantages of the present invention will be understood by reference to the following description and accompanying drawings in which:

DETAILED DESCRIPTION

Figure 6:
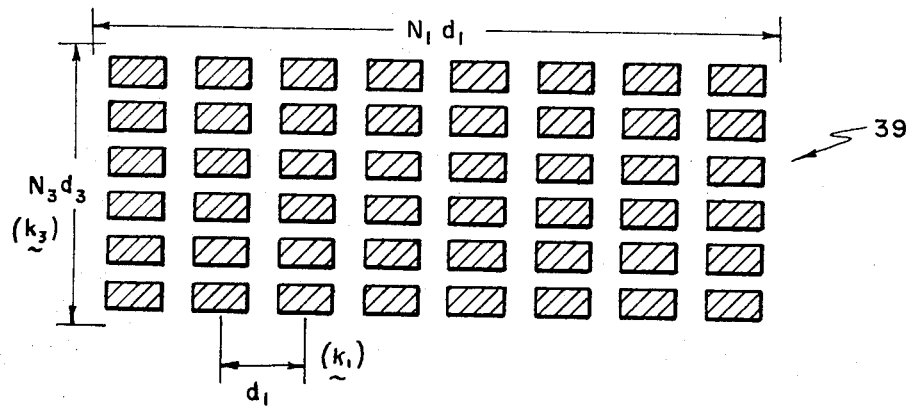
FIG. 6 is a diagrammatic plan view of the surface of a wave vector filter at the boundary layer constructed according to the principles of the invention.
Figure 4:
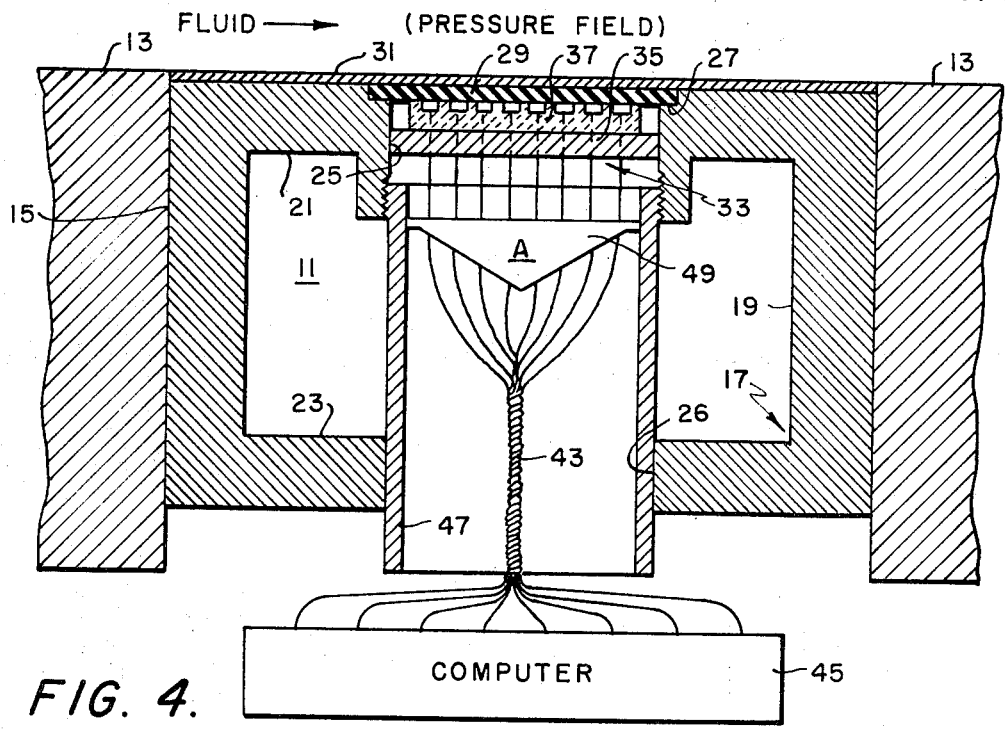
FIGS. 4 and 5 are modified views in longitudinal cross section of wave vector filters of fanciful dimensions for illustrative purposes, constructed according to the principles of the invention.
Figure 5:
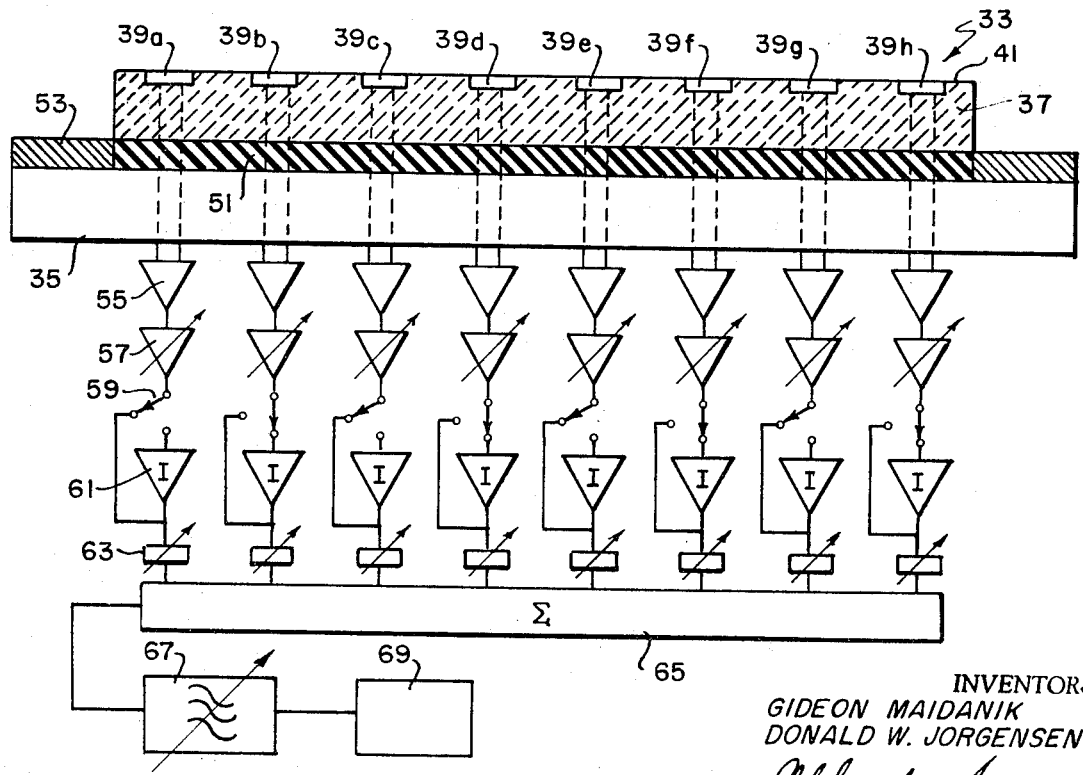

Referring to FIGS. 4, 5 and 6 the wave vector filter according to one version of the invention comprises an assembly of small acoustic transducers 11 flush mounted in a boundary surface 13 on which a pressure field under study is acting. The pressure field may arise from any source or action or combination thereof, and for purposes of illustration and not limitation, may be considered here as a pressure field due to a turbulent boundary layer. The fluid of the boundary layer may be gas, liquid or mixtures thereof, and for illustration only, may be considered as water moving past the surface 13, establishing a pressure field having a subsonic convection velocity $U_c$. Thus, in this illustration the surface 13 may be a submerged hull portion of a ship, a laboratory shape, a towed body, etc.

The filter assembly 11 fits snugly into an opening 15 in the surface 13 and is composed of a housing 17 made of any suitable material, preferably metal. The housing has a side wall 19 and opposing end walls 21 and 23 having respective central openings 25 and 26.

The outer end of opening 25 terminates in an outward facing shoulder 27 of dimensions greater than the opening 25 for receiving a thin sheet 29 of electrical insulation material such as rubber suitably bonded thereto. The outer surface of the housing 11 is formed by a very thin sheet of coating 31 of silver overlying the sheet 29 and the outer surface of wall 21. The housing 11 is recessed slightly in the opening 15 so that the coating or sheet 31 when applied forms a flush boundary with the surface 13. For measuring pressure fields in electrically nonconducting fluid environments, the sheets 29 and 31 may be omitted.

As shown in FIGS. 4 and 5, a transducer unit 33 is located within the housing and comprises a support 35 in the form of a block made of metal or plastic, and a ceramic block 37 attached thereto. The ceramic block 37 has a transducer array 39 located on its outer surface 41. The block 35 is mounted within opening 25 and affixed thereto as by bonding or welding or in any other suitable manner. Both the support 35 and the ceramic block 37 have a plurality of holes extending therethrough for passage of a bundle of output leads 43 from the transducers to a suitable output device such as a programmable general purpose computer 45. A shield 47 comprising a metallic tube is threadedly mounted in an internally threaded sleeve comprising the lower or inward portion of the opening 25, and extends from the opening 26 in surrounding relation to the leads 43. An amplifier unit 49 for the transducer outputs may be mounted electrically within the protective shield in any suitable well known manner.

As best seen in FIG. 5, that portion of the support block 35 adjacent the ceramic block 37 is composed of a body of insulating material 51, while the portion remote from the ceramic block is of electrically conductive material 53. The portions 51 and 53 respectively may consist of non-conducting and conducting epoxy for shielding the transducer output leads and for grounding the ceramic block as well as for holding the ceramic block firmly in place.

The two dimensional transducer array 39 shown in FIGS. 5 and 6 comprises a plurality of any suitable well known acoustic pressure sensitive elements such as small piezoelectric transducers indicated in FIGS. 5 and 39$a$, 39$b$, ... 39$h$, ... each of dimensions and adjacent spacing appropriate for the spectrum to be studied. As a practical matter, the insulated space between each transducer may be negligible compared with the transducer dimensions. The effective spacing between transducer for wave vector filtering may be provided by rendering certain intermediate transducers inactive. The dimensions and spacing of all the transducers may be the same or may be different in a predetermined manner depending upon the desired exceptance range and characteristics, i.e. desired wave vector acceptance region of the system. The spacing or distance between center points of adjacent transducers may be a constant for ease of fabrication even though as later discussed in connection with FIGS. 7 and 8, the transducer outputs may be electronically controlled and switched in varying combinations to effectively change the distance between transducer centerpoints and thus, the wave vector filtering characteristics of the unit.

An output system for the transducer array is also shown in FIG. 5. Each transducer 39$a$, $b$, etc. has its own output channel composed of two output leads, one connected to the outer surface and the other, to the inner surface of a silver coated piezoelectric crystal of the transducer. The leads are passed thru holes drilled in the ceramic block 37 and support 35 the individual leads may be sheathed for providing shielding.

The output of each transducer is fed to the shielded amplifier unit 49 comprising a preamplifier 55 and a gain adjusting amplifier 57 for each transducer. In each channel a two position switch 59 selectively connects the output of the gain adjusting amplifier 57 either thru a inverter 61 to a variable time delay adjusting device 63 of any suitable well known design, or directly to the variable time delay device 63. The outputs of the time delay devices are fed to a summation device 65 of any suitable well known design, which serially combines the signals from the transducers. A variable bandpass filter 67 receives the output of the summation device 65 and feeds it to a suitable readout display or meter device 69.

Figure 7:
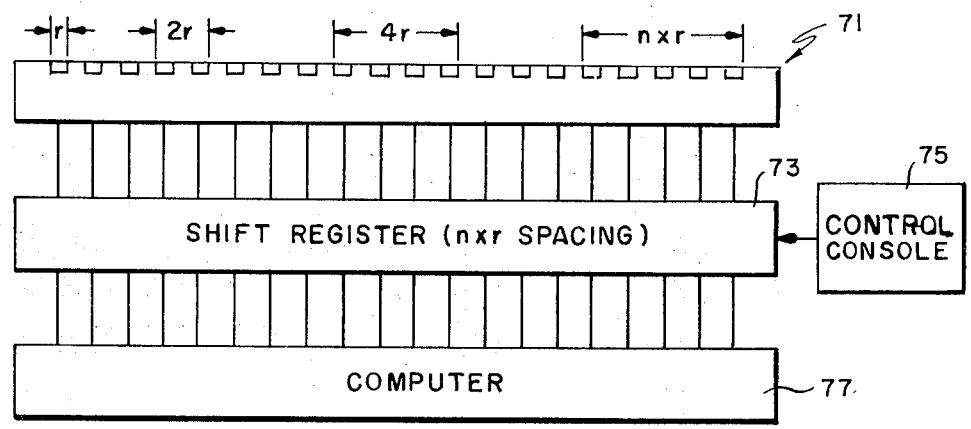
FIGS. 7 and 8 are diagrammatic views for illustrating, with expanded and fanciful dimensions, wave vector filters having variable wave vector filtering capability according to the principles of the invention.
Figure 8:
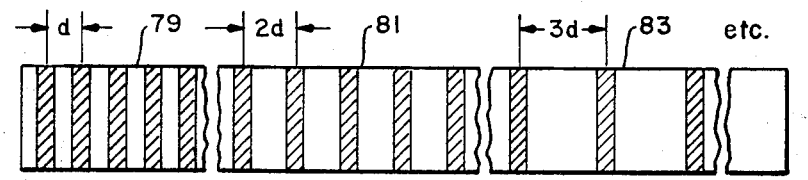

Modifications of the transducer array according to the invention are shown in FIGS. 7 and 8. In FIG. 7, a transducer array 71 comprising identical transducers of small size and of identical spacing between their respective centerpoints in the manner of the FIG. 7 array have their individual outputs connected to a suitable electrical or electronic switching system of any suitable well known design, designated here as a shift register 73. Under suitable signals from a control unit 75, the shift register may be set so that the transducer outputs are combined in a predetermined manner. For example, the outputs of the transducers may be switched in the shift register 71 for transmission thereform as a combined output of 2 adjacent transducers. Thus, if each transducer has a width $r$, and if the insulated spacing between adjacent transducers is negligible, then the outputs of each two adjacent transducers of the array may be combined in the shift register and fed to a computer 77 as one output of a single transducer of width $2r$. The transducer outputs may be combined in twos, threes, fours, etc., in the above-described manner to provide outputs to the computer representative of effective transducer widths of $2r$, $3r$, $4r$, etc., $n$, $x$, $r$, so that the acceptance characteristic (i.e. central wave vector) of the array can be varied.

The shift register 73 can be programmed from the control console 75 so that several bands can be scanned. The scanning is carried in the sense of varying the acceptance of the system in spectral space by varying frequencies, phasing and to a limited extent, shading. The output signals fed to the computer 77 may be processed therein according to known programming methods to provide shading and phasing for determining the wave vector characteristics related to the pressure field under study. The output from the computer 77 may be displayed or read out in any suitable well known manner.

The arrangement of FIG. 8 is alternative to that of FIG. 7 in that instead of employing equidistantly spaced transducers, the transducers are arranged in a desired plurality of separate groups exemplarily shown as 79, 81 and 83 respectively, the spacing between transducers in each group being different from group to group. Thus, as shown, transducer group 79 has a spacing of $d$ between centerpoints of adjacent transducers; group 81 has a spacing of $2d$, and group 83, a spacing of $3d$. Of course, other spacings including fractional coefficients could be used. The acceptance characteristic may therefore, be varied from group to group by means of selective connection to readout means.

OPERATION

In operation, the response of the transducer system is measured in a chosen frequency band. In the measurement, the incremental time associated with the incremental bandwidth must be sufficient to insure that the pressure field has interacted with all of the transducers of the array.

Figure 3:
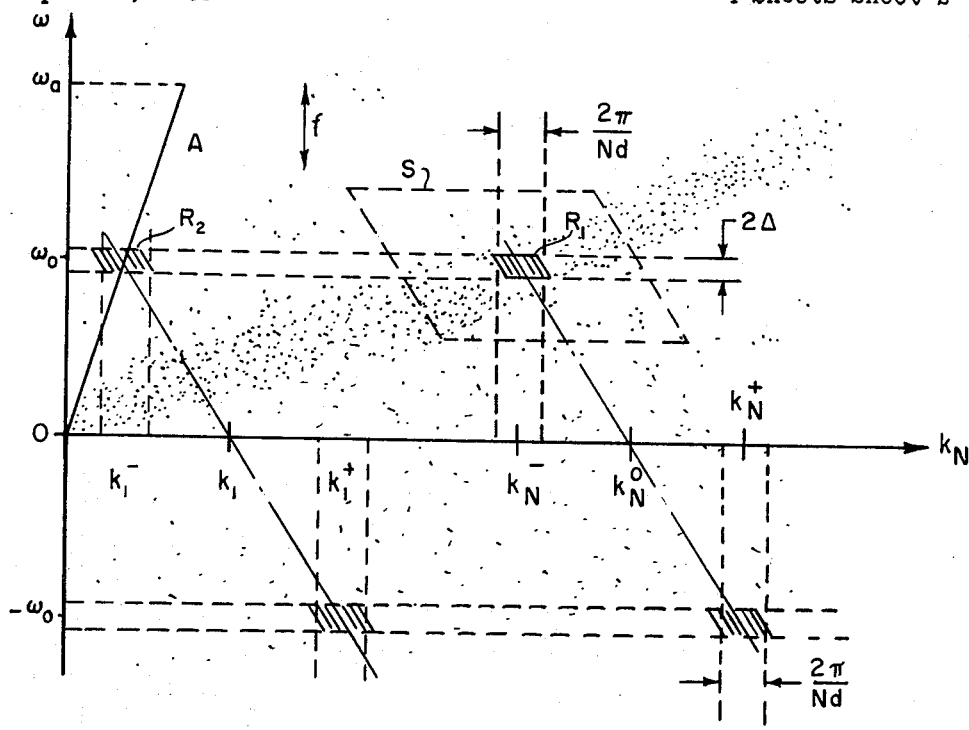
FIG. 3 is an explanatory graph depicting the region of acceptance in $k_1$, $\omega$ space of the wave vector filter in conjunction with phase shifting and frequency shifting a single band wave vector filter for measurement of the spectral density of a pressure field acting on a boundary.

The response of the transducer array, which, of course, may be stated mathematically, is seen as a function of the spatial filtering and frequency filtering of the array. Referring to FIG. 3, by varying the frequency filtering in filter 67 of the FIG. 5 arrangement, $\omega$ is varied thus affording a sweep across the region $R_1$, FIG. 3. Variation of $\omega$ affords an indication of pressure distribution in $R_1$ as a function of frequency, and such data can be read out in device 69.

Figure 1:
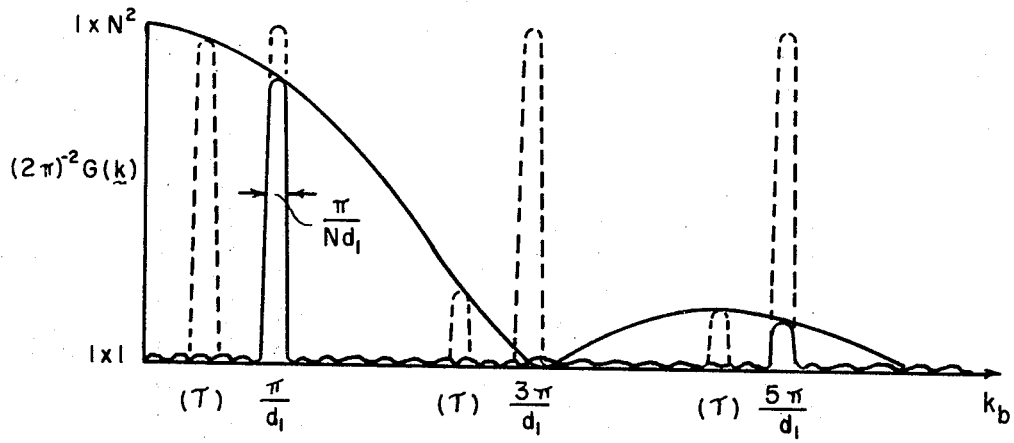
FIGS. 1 and 2 are previously referred to explanatory graphs for single and multiple band wave vector filters respectively, in which the system response is plotted against the wave vector in a given direction.

The frequency can be held constant while sweeping thru $R_1$ by varying the wave number (i.e. spatial acceptance) of the array. In the case of a single band filter, FIG. 1, the single wave number may be displaced by varying the time delay in devices 63, FIG. 5, and thus the phasing of the array, thus moving the acceptance peak as shown in FIG. 1. In such instance, the region $R_1$ or even the larger regions, may be swept in terms of the spectral density of the pressure field at an essentially fixed frequency.

In order to establish and optimize the single band characteristic of the single bandwidth wave vector filter, the sensitivity of each transducer of the array may be effectively adjusted by means of adjustable amplifiers 57 and inverters 61. As can be inferred from the graph of FIG. 1, small secondary bands may exist in the single band filter even though the array characteristics have been set up to provide single band operation.

For example, in setting up the filter for single band operation, an array composed of closely spaced successive transducers of respective widths $r$, $2r$, $r$, $2r$, etc., may be provided with a central wave number of $\pi/3r$. This wave number is achieved by adjusting the sensitivity (in the sense of polarity) of alternate ones of the $2r$ transducers as positive, and even ones, negative; the $r$ width transducers being disconnected to be inactive. With such an array connected to an appropriate computer or to the system of FIG. 5, for example, coupling of alternate ones of the switches 59 to the inverters 61 would provide the desired single band filter.

Figure 2:
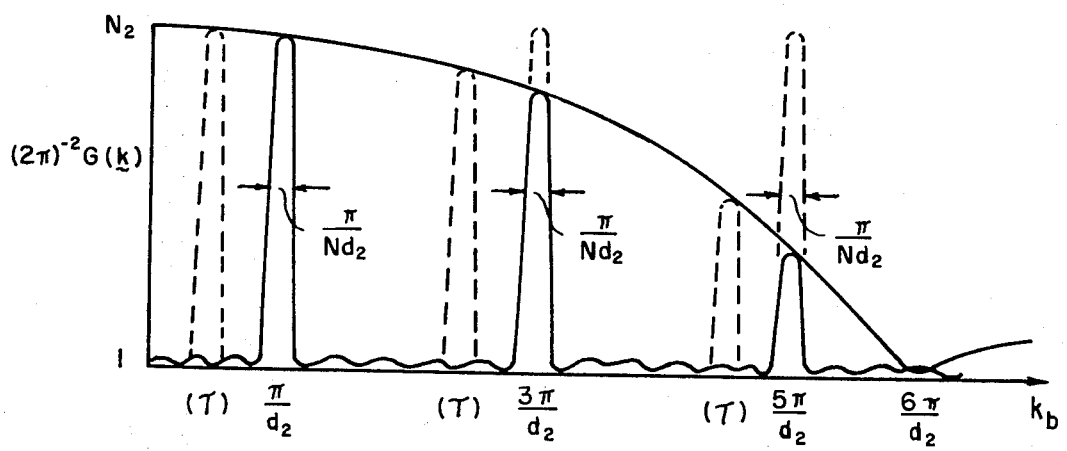

To minimize secondary spatial acceptance bands in the single band filter, the sensitivities of the transducers in terms of amplitude response may be adjusted by means of amplifiers 57. Of course, the above-mentioned operations apply also to the multi-band filter which, as indicated in FIG. 2, can be varied as to characteristics in the same manner as the single band.

In certain situations the pressure field to be measured is masked by another one of more sources, such as is illustrated in FIG. 3 by the region $R_2$ which is intended to include both an acoustic signal wave pressure field and part of another pressure field, say, that of a turbulent boundary layer. To measure the frequency and wave vector distribution characteristics of the pressure field on the boundary due to turbulence in this situation, the transducer output of the wave vector filter system of FIG. 5 may be connected so that alternate outputs are inverted and the sensitivities of each transducer adjusted so that in the summation of all of the outputs in serializer 65, those representing the acoustic signal are canceled and those representing the pressure field of interest are additive.

It is understood that the transducer arrays shown in FIGS. 7 and 8 may be employed as single or multi-band filters depending upon interconnection of the transducers and manner of reduction of the data outputs therefrom. For example, instead of employing an electrical/electronic system as shown in FIGS. 4 and 5, the output of each transducer as shown in FIG. 4 may be fed to a computer as previously recorded signals, and operated upon by suitable program in the computer to accomplish shading, phasing and frequency shift to provide output data in analog or digital form representing frequency and wave vector distribution characteristics of any pressure field under study.

It is to be understood that the invention is not limited to the exact details of construction shown and described for obvious modifications will occur to persons skilled in the art.

What is claimed is:

1. A system for determining the spectral distribution characteristics of a turbulent boundary layer pressure field incident on a boundary surface comprising:
   means comprising an array of pressure sensitive transducers flush mounted in the boundary surface;
   the size and adjacent spacing of said transducers along said boundary predetermining in relation to the incident pressure field predetermined wave vector acceptance characteristics of said array within at least one frequency band;
   output means connected to the transducer array for receiving during interaction of the pressure field with essentially all of the transducers of said array, the signals from said array in essentially serial form;
   said output means including means for varying said frequency band within a predetermined range to produce an output signal indicating the pressure distribution of the incident pressure field as a function of frequency.

2. A system for determining the spectral distribution characteristics of a turbulent boundary layer pressure field incident on a boundary surface comprising:
   means comprising an array of pressure sensitive transducers flush mounted in the boundary surface;

the size and adjacent spacing of said transducers along said boundary predetermining in relation to the incident pressure field, predetermined wave vector acceptance characteristics of said array within at least one frequency band;

output means connected to the transducer array for receiving during interaction of the pressure field with essentially all of the transducers of said array, the signals from said array in essentially serial form; and said output means including adjustable means selectively connectable to each transducer for varying the output signal therefrom to vary the wave vector acceptance characteristics of said array for producing a signal indicating the spectral density of the pressure field at an essentially fixed frequency.

3. The system according to claim 2 wherein said adjustable means comprises time delay means for each selectively connected transducer.

4. The system according to claim 2 wherein said adjustable means comprises variable amplitude and polarity sensitivity means for each selectively connected transducer.

5. The system according to claim 1 wherein the predetermined wave vector acceptance characteristics essentially define that of a plurality of wave numbers.

6. A wave vector filtering system for determining the spectral nature of a particular varying field in a turbulent boundary layer, comprising:

a sensing array comprising a plurality of sensing means flush-mounted in a boundary surface upon which said field is acting, said sensing means being of a predetermined size, having a predetermined spacing between the centerpoints of each other, and electrically connected for individual shading and phasing;

output selection means connected to said plurality of sensing means;

variable bandpass filter means connected to said output selection means for varying the frequency response of said sensors; and display means connected to said filter means for displaying the sensed information concerning the spectral nature of said field as a function of frequency;

said output selection means selectively combining the outputs of said sensing means to render certain of said sensing means inactive, thereby effectively changing the spacing between individual sensing means and consequently changing the wave vector acceptance characteristics of said array when desired.

7. A wave vector filtering system as recited in claim 6, wherein said output selection means comprises:

a preamplifier connected to each of said sensing means;

a variable gain adjusting amplifier connected to each preamplifier for adjusting the sensitivity of said sensing means;

an inverter for each sensing means;

a variable time delay device connected to each inverter;

switching means for selectively connecting said variable gain adjusting amplifier either to said inverter or directly to said variable time delay device; and a summation device connected to all of said variable time delay devices.

8. A wave vector filtering system as recited in claim 6, wherein said output selection means comprises:

a shift register connected to said plurality of sensing means;

a control console connected to said shift register; and a computer connected to said shift register;

whereby said control console produces a signal which directs said shift resister to combine the output of said sensing means in a predetermined manner, thereby feeding signals to said computer which represent information concerning wave vector distribution characteristics of said field under study.

9. A wave vector filtering system as recited in claim 6, wherein said field under study is a pressure field and said sensing means are pressure transducers.

References Cited
UNITED STATES PATENTS

| | | | |
|---|---|---|---|
| 2,551,526 | 5/1951 | Campbell | 73—147 |
| 2,871,698 | 2/1959 | Bagby | 73—147 |
| 3,185,956 | 5/1965 | Voglis et al. | 340—6 |

DONALD O. WOODIEL, Primary Examiner